US 6,687,981 B2

(12) United States Patent
Hook

(10) Patent No.: US 6,687,981 B2
(45) Date of Patent: Feb. 10, 2004

(54) APPARATUS FOR POSITIONING LEADS OF A POWER GENERATOR

(75) Inventor: Michael D. Hook, Trafford, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/929,726

(22) Filed: Aug. 14, 2001

(65) Prior Publication Data

US 2003/0033710 A1 Feb. 20, 2003

(51) Int. Cl.[7] .............................................. H01R 43/00
(52) U.S. Cl. ............................ 29/760; 29/759; 29/749; 29/721; 29/732; 29/755; 269/903
(58) Field of Search ......................... 29/876, 760, 759, 29/749, 866, 33 M, 721, 732, 729, 596, 874, 755; 269/903, 901; 263/262

(56) References Cited

U.S. PATENT DOCUMENTS

| 3,459,878 A | 8/1969 | Gressit et al. ............... 174/112 |
| 4,654,967 A | 4/1987 | Thenner ...................... 29/860 |
| 5,355,583 A | 10/1994 | Osumi et al. .................. 29/876 |
| 5,581,873 A | 12/1996 | Okura et al. .................. 29/760 |
| 5,594,982 A | 1/1997 | Dobbeck .................... 29/243.5 |
| 5,895,034 A | 4/1999 | Shea ............................. 269/3 |
| 2003/0033710 A1 | 2/2003 | Hook ........................... 29/732 |

FOREIGN PATENT DOCUMENTS

| GB | 195722 | 4/1923 |
| GB | 559061 | 2/1944 |

*Primary Examiner*—Carl J. Arbes
*Assistant Examiner*—Minh Trinh

(57) ABSTRACT

An apparatus is provided to assist a user in aligning and sizing a plurality of spaced-apart channels to be formed in a cleat connected to a power generator housing so as to secure a plurality of leads extending from a power generator through the housing. The apparatus includes a main member to which secondary members removably and movingly connect to align with the leads. Channel sizers connect to the secondary members to register the diameter of each lead. The apparatus first aligns with and registers the diameter of each lead and is then positioned adjacent the housing to assist the user in correctly spacing and forming holes in a support structure such as a cleat. Related methods are also provided for aligning and sizing channels to be formed in a cleat or other support structure to secure the leads extending from the power generator through the housing.

9 Claims, 5 Drawing Sheets

APPARATUS FOR POSITIONING LEADS OF A POWER GENERATOR

FIELD OF THE INVENTION

The present invention relates to power generation systems and more particularly, to the construction and maintenance of power generation systems.

BACKGROUND OF THE INVENTION

An electric power generator generally includes a rotor that rotates within a stator core to convert mechanical energy into electrical energy. The stator often includes a set of parallel rings which attach to at least one lead. The lead carries the power generated by the power generator typically to a bus adapter connected to connectors (e.g., flex connectors) that convey electric power to a plant bus for distribution to residential, commercial, and other consumers of electric power. Because the power generator is encased within a housing and the bus assembly is positioned outside the housing, the lead must extend from the power generator through the housing to connect to the bus adapter. Often, the lead extends from the housing through a lead box positioned on the housing. To facilitate the lead extension through the housing or, more specifically, the lead box, cleats associated with the main or neutral leads are fitted in the housing or lead box to hold in place therein the leads. To fit the cleat to the lead to secure the lead through the housing or lead box, a hole must be formed therein.

Most electrical power generator systems in use today are polyphase in the sense of utilizing multiple, distinct voltages that are out of step with one another. Commonly, an electric power generator is a three phase system. In a polyphase generator, multiple leads transfer power from the generator. For example, a three phase system will utilize three leads. Thus, in fitting the cleat to each lead for positioning each in the housing or lead box, multiple holes (typically, three) must be formed therein.

Specifically, in the context of a polyphase generator system having multiple leads, each of the holes must be appropriately spaced-apart so as to accommodate the multiple leads, while each hole must be of an appropriate dimension to accommodate the diameter of the lead to extend therethrough.

Conventional techniques for fitting a cleat associated with a lead have included attempting to take the large cleat into the lead-box in order to get an accurate fit between each lead and cleat. An alternative technique has been to use cardboard cutouts to mimic the alignment and size of each of the leads so as to accurately position and size each hole. The techniques have all proven to be inefficient in several respects. For one, these methods are time consuming. It is not only arduous but it is very time consuming to take the large cleat into the lead-box to attempt to gauge where each hole should be formed and how large it should be. A cardboard cutout may be somewhat less arduous, but ease comes at the cost of requiring even greater expenditure of time in precisely marking out the dimensions of the cutout if it is to be even remotely accurate.

Not only are these techniques inefficient, they are inaccurate as well. A cleat taken into the lead box can not easily be lined-up with corresponding leads. A cardboard cutout can inadvertently be bent or mangled as well as being inaccurately cut. As a result, there often are misalignments of the spacing between the holes for each lead. In addition, the sizing of the holes are frequently inaccurate. If the holes are not accurately aligned and sized, the cleat may be damaged. As a result material is wasted when the process has to be repeated. Thus, inefficiencies are exacerbated when time and material is wasted as a result of misalignment and inaccurate sizing.

SUMMARY OF THE INVENTION

In view of the foregoing, the present invention advantageously provides an apparatus to assist a user in aligning and sizing a plurality of spaced-apart channels to be formed in a cleat connected to a power generator housing so as to secure a plurality of leads extending from a power generator through the housing. The apparatus advantageously allows the channels to be accurately spaced-apart so that the distance between each matches the distance between each lead. Moreover, the apparatus advantageously assists the user in forming each channel such that the diameter or other dimensions accurately corresponds to the diameter or dimensions of the lead that is to extend therethrough. Among the advantages of the present invention are the ability to move the apparatus easily and quickly to any location, including adjacent a plurality of leads and a power generator housing through which the leads are to extend. The apparatus advantageously can adjust to reflect the alignment and size of the leads and then easily moved to be positioned adjacent the cleat or other structure in which channels are to be formed. Thus, the apparatus saves time, eases the burden, and avoids damage and waste in fitting channels to accommodate multiple leads.

The lead can be formed of a main member that is adapted to connect to a housing or other structure. A plurality of secondary members removably and movingly attach to the main member. In a preferred embodiment, the main member and each of the secondary members are each thin and substantially flat two-sided elongated pieces. Moreover, a channel is formed in each of the main member and the plurality of secondary members. Each channel preferably extends through both sides of the elongate pieces and extends almost the entire lengthwise extent thereof. The preferred means of fastening the secondary members to the main member is provided by a plurality of removable nut and bolt assemblies that extend into the respective channels. Thus, each secondary member slidably connects along almost the entire lengthwise extent of the main member and is able to be spaced-apart almost any distance from every other secondary member. Moreover, each elongate secondary member extends outwardly from the main member and is substantially free to move radially as well as axially relative to the main member.

The apparatus advantageously can be positioned adjacent the plurality of leads, and each of the plurality of secondary members can quickly and efficiently be made to correspond to the spacing between each of the leads. Then each of the respective secondary members can be secured in place using a corresponding nut and bolt assembly. Thus, rapidly and efficiently, the user has a secure guide where each channel is to be formed in a cleat or other support structure so as to accommodate the spacing between each of the leads.

Preferably associated with each secondary member, moreover, is a channel sizer that registers the diameter or dimension so as to also guide the user in forming the plurality of spaced-apart channels. Again, the user has a rapid and efficient means for registering the shape and dimension that each of the plurality of channels should have to properly accommodate therein a corresponding lead.

The present invention also provides a method for aligning and sizing a plurality of spaced-apart channels that are to be formed in a cleat or other support structure. The method preferably includes aligning a first section of a sectioned tool relative to a first lead spaced-apart from the support structure and at least a second section of a sectioned tool relative to a second lead spaced-apart the first lead a predetermined distance. The method further includes positioning the tool adjacent the support structure to guide a user of the tool in forming at least a first and a second hole in the support structure such that the first hole is spaced-apart from the second hole at the predetermined distance and such that each hole is sized to accommodate respectively each lead. In addition, the method further preferably includes registering the dimension (e.g., radial diameter) of each lead. These methods, too, improve accuracy in forming a plurality of channels as well as reduce effort and cut down on wasted time and materials stemming from inaccurate channel formation.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation, if used, indicate similar elements in alternative embodiments.

Figure 1:
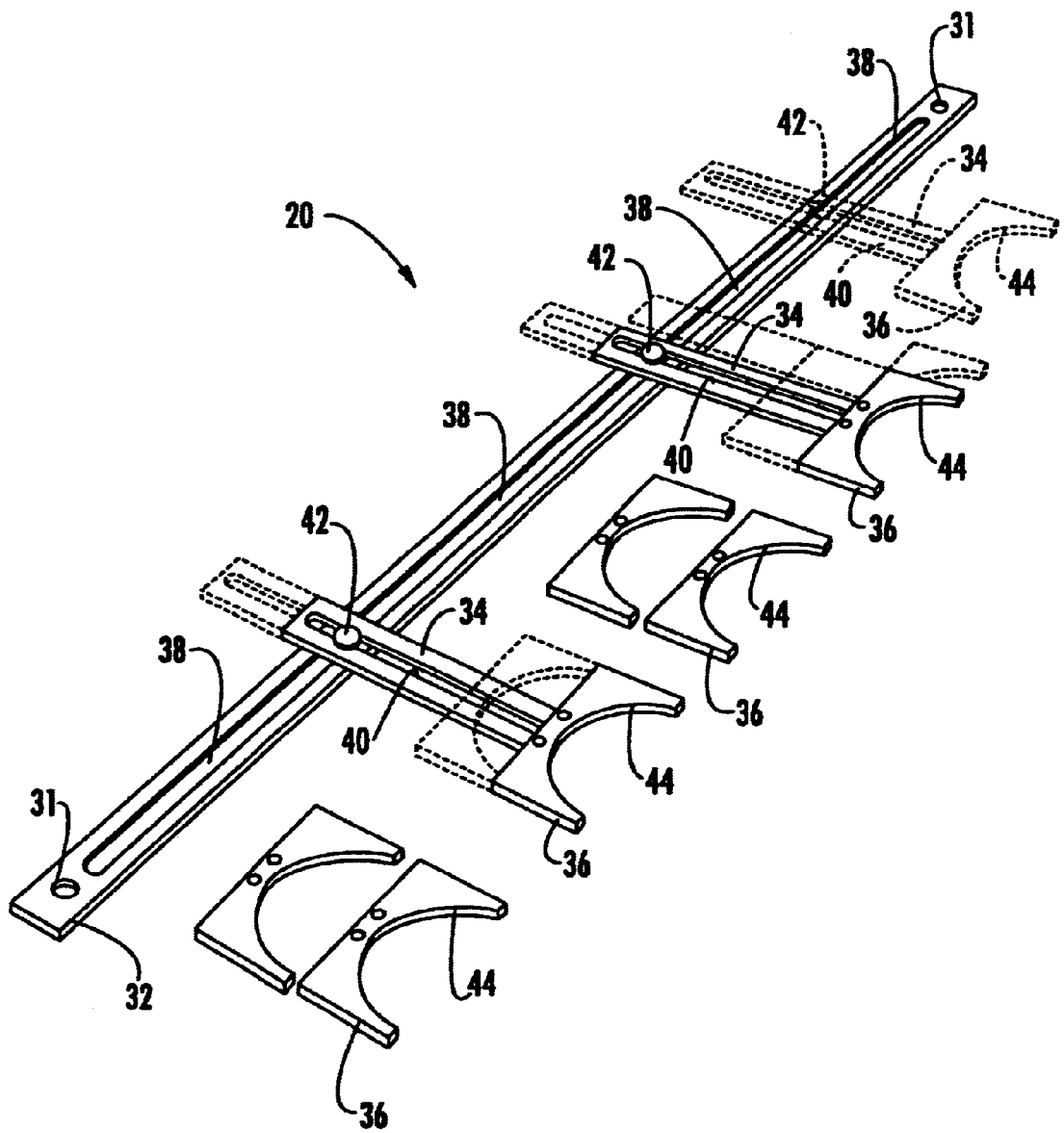
FIG. 1 is a perspective view of an apparatus to assist the user in aligning and sizing a plurality of channels in a support structure according to a first embodiment of the present invention.

FIG. 1 illustrates an apparatus 20 in the form of a sectioned tool to assist a user in constructing and maintaining a power generator 22. It will be understood by those skilled in the art, however, that various shapes, sizes, and constructions of a tool or other device could readily be used as well that has the elements as claimed according to the present invention. For example, the apparatus 20, more specifically, assists the user in aligning and sizing a plurality of spaced-apart channels to be formed in a support structure 24 that connects to a power generator housing 26. The support structure 24 can be any device that securely holds at least one lead, and preferably a main or neutral lead and more preferably a main lead, extending through a lead box or a portion of the power generator housing 26. Preferably, the support structure 24 is at least one cleat positioned in a lead box or positioned connected to a portion of the power generator housing 26.

Figure 2:
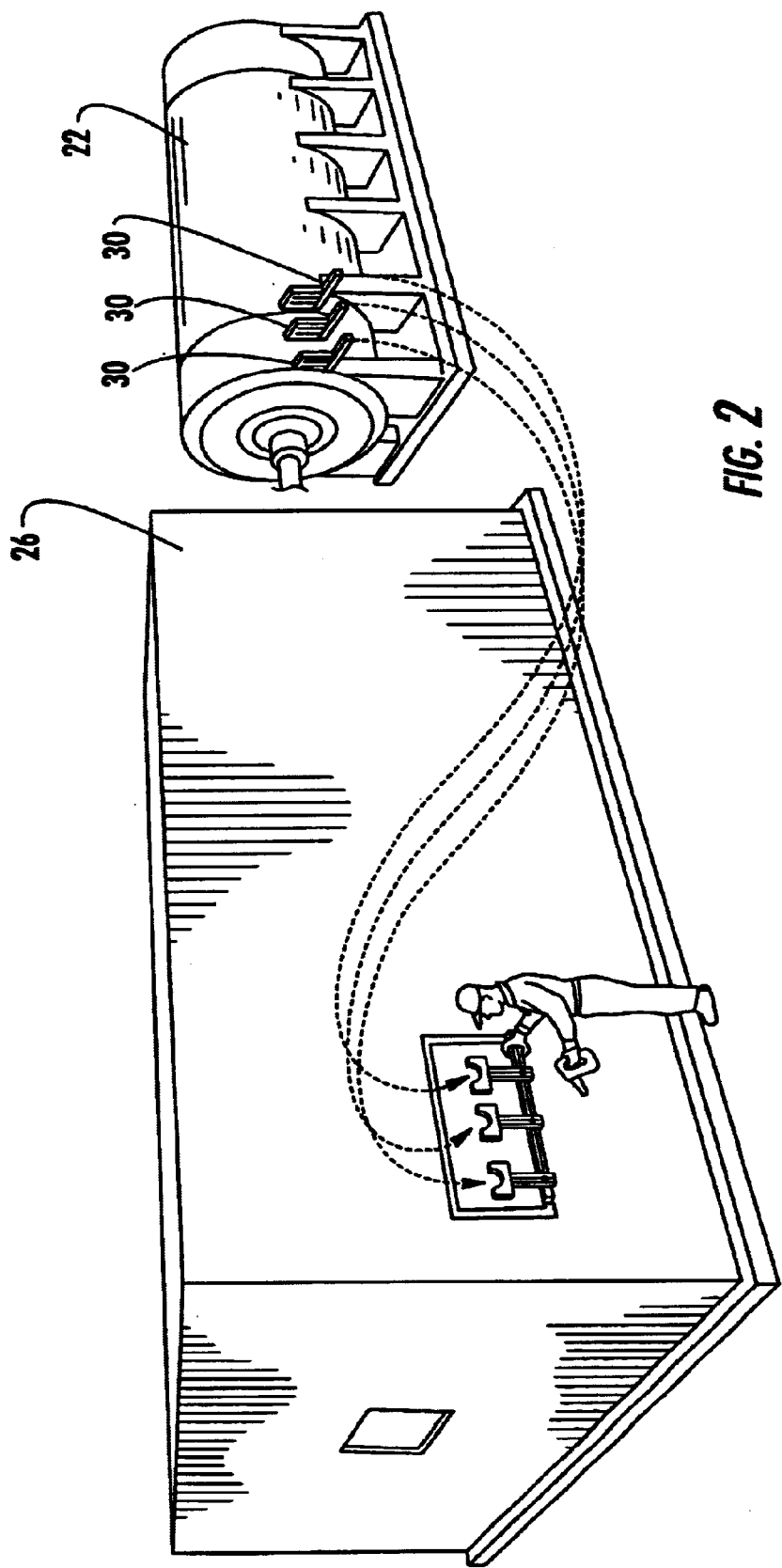
FIG. 2 is an exploded perspective view of a power generator and a power generator housing in which channels are to be formed with the assistance of an apparatus to assist the user in aligning and sizing a plurality of channels in a support structure according to the present invention.

As perhaps best illustrated in FIG. 2, the apparatus 20 assists the user in forming each of the plurality of spaced-apart channels 28 in the support structure 24 to accommodate a plurality of leads 30 extending from the power generator 22 through the housing 26 via channels 28 formed in the support structure 24. Specifically, the apparatus 20 assists the user in spacing apart each of the plurality of channels 28 so as to accurately coincide with each predetermined distance between each of the plurality of leads 30. The apparatus 20 also assists the user in forming each of the plurality of spaced-apart channels 28 such that each has dimensions sufficient to accommodate a corresponding one of the plurality of leads 30, as for example in registering the diameter that matches the cross-sectional diameter of a corresponding one of the plurality of leads 30 to extend therethrough or connect thereto.

Figure 4:
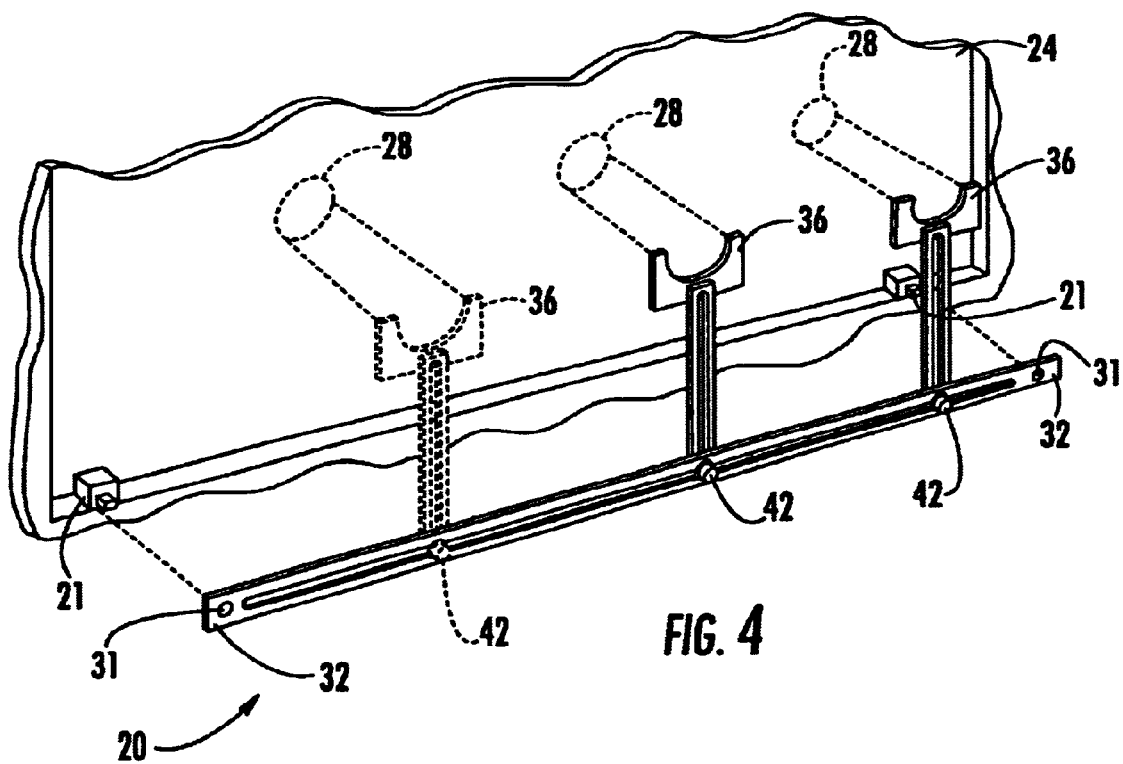
FIG. 4 is a perspective view of a power generator housing having a first embodiment of a plurality of leads extending through a support structure of the power generator housing formed by the use of an apparatus to assist the user in aligning and sizing a plurality of channels positioned adjacent the support structure according to the present invention.

The apparatus 20, as expressly shown in FIGS. 1 and 4, includes a main member 32 that is adapted to connect to or be held adjacent the housing 26 and support structure 24 such as by openings 31 shown or other notches, grooves, slots, fittings, or other devices as understood by those skilled in the art. Connected to the main member 32 is preferably a plurality of spaced-apart secondary members 34, e.g., preferably two members 34 as shown, but three as shown in phantom view in FIG. 1 or more can be used as well. Although not preferably and not nearly as advantageous due to the ease and efficiency of aligning and sizing, it would also be understood that only one could be used if markings or other indicators are used on the main member 32. Each of the plurality of secondary members 34 is adapted to movingly connect to the main member 32 at a plurality of spaced-apart locations. This permits the user to space apart each of the plurality of secondary members 34 connected to the main member 32 such that each pair of secondary members 34 can be spaced-apart from each other at a distance corresponding to a related distance between corresponding pairs of the plurality of leads 30. This assists the user in selecting where on the support structure each of the plurality of spaced-apart channels should be formed such that the plurality of spaced-apart channels are aligned with each of the plurality of leads. The movement, for example, can advantageously be a sliding movement within a main channel 38 as shown.

As also shown in FIGS. 1, 4, and 7–8, the apparatus 20 further includes a plurality of channel sizers 36,47. Each channel sizer 36,47 is adapted to connect to a corresponding one of the plurality of secondary members 34 to assist the user in sizing each of the plurality of spaced-apart channels 28 to be formed in the support structure 24 such that the size of each of the spaced-apart channels accommodates a corresponding one of the plurality of leads. As will bb apparent as the present invention is described in more detail herein, the apparatus 20 can be used equally advantageously in a factory setting in which a power generator system is being manufactured or on a remote job site where a power generator is in operation.

The present invention further includes secondary member fastening means for fastening each of the plurality of secondary members 34 to the main member 32. The secondary member fastening means is preferably provided by a plurality of fasteners 42 such as threaded bolts, screws, rivots, pins, or clamps in which each of the plurality of secondary members 34 is securely connected to the main member 32 by a fastener 42, e.g., preferably fully or partially removable, that adjustably tightens around the corresponding one of the plurality of secondary members 34 and the main member 32. Alternatively, each of the plurality of secondary members 34 can include fixedly connecting to an end portion thereof a similar type fastener for securing the secondary member 34 to the main member 32. Still further, for example, the secondary member fastening means can include forming each of the plurality of secondary members 34 of a suitable metallic material and forming the main member 32 of a magnetic material so as to hold each of the plurality of secondary members 34 to itself by magnetic attraction.

Alternatively, and more simply, the secondary member fastening means can be provided by a fastener 42 having a threaded extension defining a connected bolt on each of the plurality of secondary members 34. Each extension preferably is adapted to extend through an opening in the main member 32 and to be secured therein by a threaded nut as understood by those skilled in the art. Preferably, however, the secondary member fastening means can be provided by a plurality of independent nut and bolt assemblies 36 whereby each of the plurality of secondary members 34 and the main member 32 each having openings extending therethrough to receive one of the plurality of independent nut and bolt assemblies 36. Accordingly, the fastening means provided by the plurality of independent nut and bolt assemblies are readily detachable and permit each of the plurality of secondary members 34 likewise to be readily detached from the main member 32, if desired. This secondary member fastening means, moreover, provides distinct advantages in the context of the preferred structures of the plurality of secondary members 34 and the main member 32 as described in detail below.

Preferably, the main member 32, 32' has an elongate main member body. More specifically, and as explicitly shown in the first and second embodiment of the invention in FIGS. 1, 4, and 7, the main member body preferably is an elongate body having a thin and substantially flat, two-sided form. Moreover, the elongate main body member preferably further includes a main channel 38, 38' formed therein. Preferably, the main channel 38, 38' is continuous and extends through both sides of the thin and substantially flat main member body of the main member 32, 32'. Thus formed, the main channel 38, 38' is adapted to receive the nut and bolt assemblies 42, 42' described above so as to secure each of the plurality of secondary members 34, 34' to the main member 32, 32'. Accordingly, each of the plurality of secondary members 34, 34' removably and slidably connects to a plurality of locations along the lengthwise extent of the main channel 38, 38' formed in the elongate main member body of the main member 32, 32'. Moreover, each of the plurality of secondary members 34, 34' that is removably and slidably connected to the elongate main member body can further be rotated in a plane parallel to the elongate main member body to thereby provide greater degrees of freedom in positioning each of the secondary members 34 connected to the main member 32.

Alternatively, the main member 32, 32' can include an elongate main member body having a plurality of discrete secondary member connectors provided, for example, by a series of holes or other shaped openings spaced at discrete intervals and extending through the thin and substantially flat main member body to thereby receive each of the plurality of nut and bolt assemblies 42. The advantage of the preferred form in which a continuous channel 38 is formed in the main member 32 is that the channel provides a continuum of points therein at which each of the plurality of secondary members 34 can connect to the main member 32.

Figure 7:
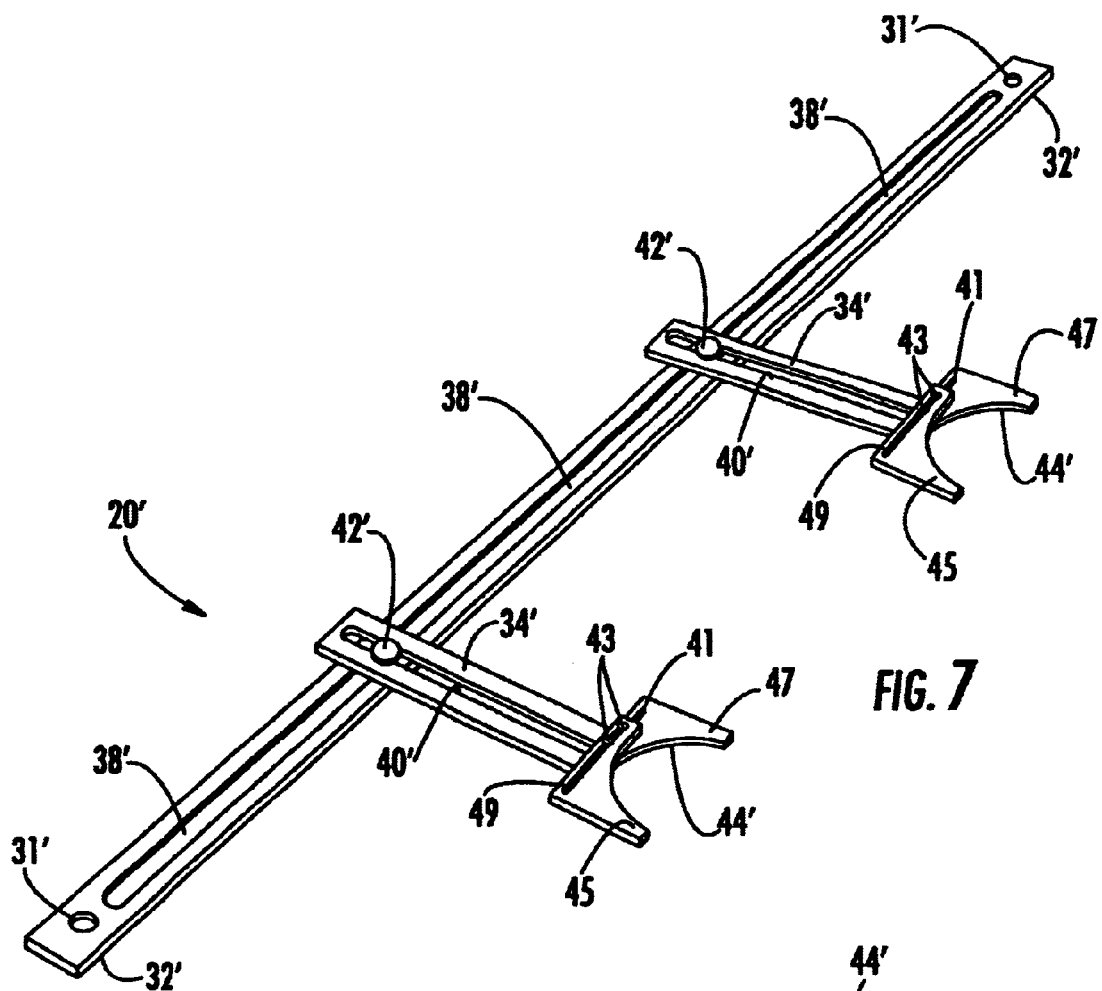
FIG. 7 is a perspective view of an apparatus to assist the user in aligning and sizing a plurality of channels positioned adjacent a support structure according to a second embodiment of the present invention.

Preferably, each of the secondary members 34, 34' is also formed as explicitly shown in FIGS. 1, 4, and 7 into an elongate body having a thin and substantially flat, two-sided form. Likewise, each of the secondary members 34, 34' preferably includes a secondary channel 40, 40' formed therein. Preferably, each secondary channel 40, 40' formed in each of the plurality of secondary members 34, 34' is continuous and extends through both sides of the thin and substantially flat secondary member body of the secondary member 34, 34'. Thus formed, each secondary channel 40, 40' is adapted to receive the nut and bolt assemblies 42, 42' or other fastening means described in detail above for securing each of the plurality of secondary members 34, 34' to the main member 32, 32'. Accordingly, each of the plurality of secondary members 34, 34' is free to slidably move in a substantially radial direction relative to the main member 32, 32' as well as in the substantially axial direction coextensive with the lengthwise extent of the main member 32, 32' as already described in the context of the main channel 38, 38' formed in the elongate main member body of the main member 32, 32'.

The apparatus 20, 20' of the present invention further includes channel sizer fastening means for connecting the plurality of channel sizers 36, 47 to the plurality of secondary members 34, 34'. The channel sizer fastening means is preferably provided by the fasteners 42, 42' described in the context of connecting each of the plurality of secondary members 34, 34' to the main member 32, 32. Preferably, as illustrated in FIGS. 1, 4, and 7–8, each of the plurality of channel sizers 36, 47 is connected using a nut and bolt assembly, screw, rivot, pin, clamp or other fastener 42, 43.

Figure 5:
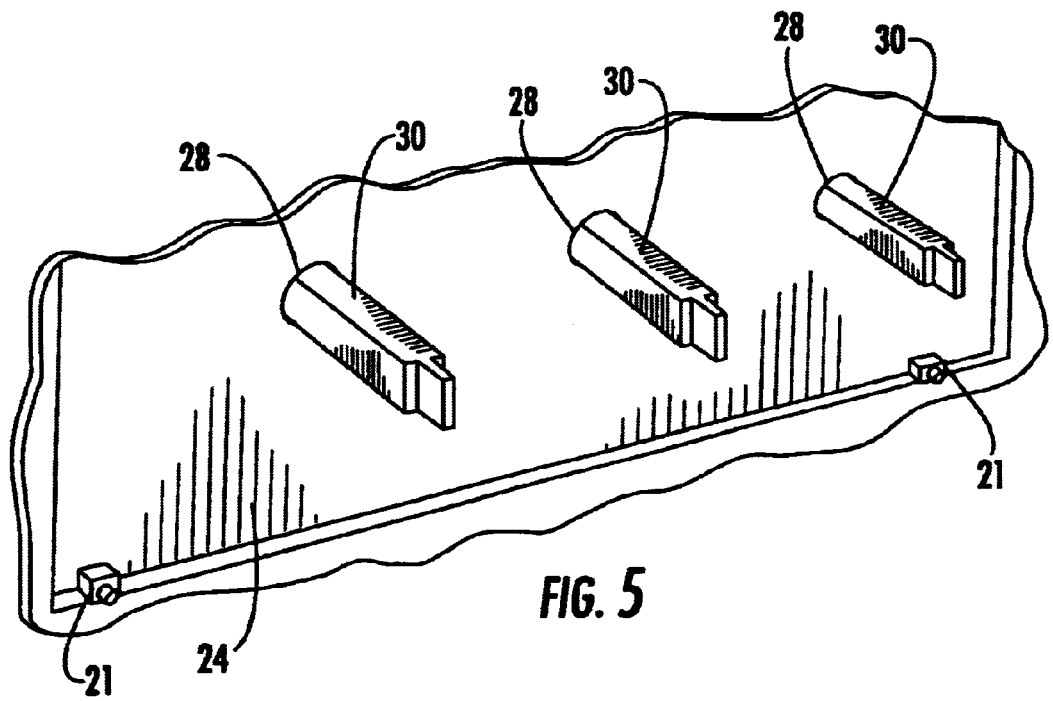
FIG. 5 is a fragmentary perspective view of a first embodiment of a plurality of leads extending through a support structure of a power generator housing formed by use of an apparatus to assist the user in aligning and sizing a plurality of channels positioned adjacent the support structure according to the present invention.
Figure 6:
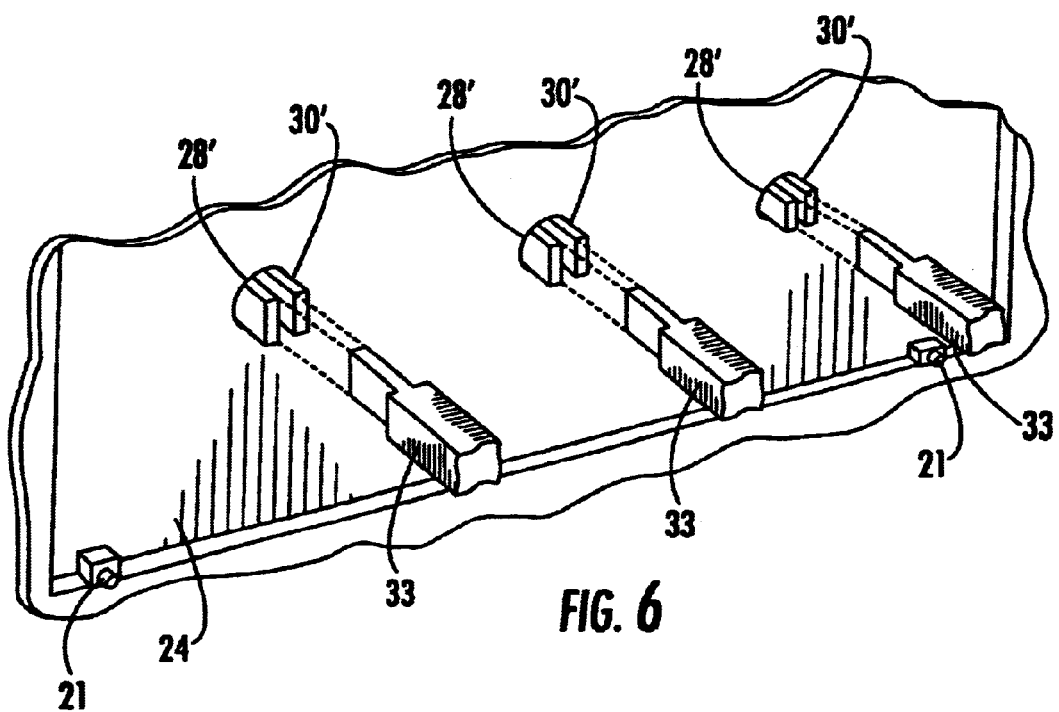
FIG. 6 is an exploded fragmentary perspective view of a second embodiment of a plurality of leads extending through a support structure of a power generator housing formed by use of an apparatus to assist the user in aligning and sizing a plurality of channels positioned adjacent the support structure according to the present invention.
Figure 8:
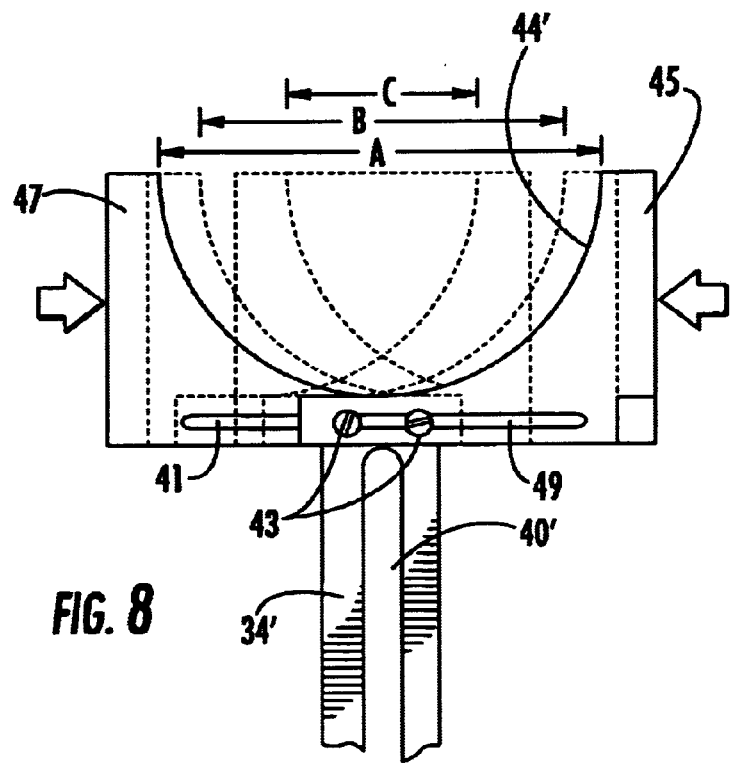
FIG. 8 is an enlarged fragmentary perspective view of a portion of an apparatus to assist the user in aligning and sizing a plurality of channels positioned adjacent a support structure according to a second embodiment of the present invention.

Each of the plurality of channel sizers 36, 47 preferably includes a body member having an outer edge portion 44, 44' formed to match at least a portion of the surface of a lead 30, 33. Moreover, each channel sizer 36 preferably is formed into a support structure such as a substantially rectangular plate formed of a lightweight material and having one edge cut away to thereby permit the edge of the channel sizer 36, 47 to fit substantially smoothly against a surface portion of the surface of the lead 30, 30', 33. The leads, for example, are preferably conductors which are preferably insulated for passing power from a generator to a bus assembly or other portions of a power generations system. The leads can extend completely through channels, can have a first portion 30' extend through a channel and a second portion 33 connect to the lead as perhaps best shown in FIGS. 5–6, or can have a portion connect to a support structure, a cleat or other connective device and have a second portion that also connects to the support structure, the cleat or other connective device to allow the power to be transmitted through the connective device. As explicitly illustrated in FIGS. 1 and 4, each outer edge portion 44 is specifically adapted to fit to leads having a substantially annular cross section. As will be apparent to those skilled in the art, the outer edge portions 44 can be formed into other shapes as well to accommodate main or neutral leads having differently shaped cross sections. The apparatus 20 can also accommodate main or neutral leads having different diameters. For example, the apparatus 20 can include multiple sets of fixed sized channel sizers, each set providing a plurality of channel sizers with a different diameter such as shown in FIG. 1. Alternatively, as shown in FIGS. 7–8, each channel sizer 47 can be sectioned into at least two portions or pieces 43, 45 and formed so that the sections are either joined by an adjustable piece that allows the diameter of the channel sizer to be varied by adjusting where on the piece each of the distinct portions of the channel sizer attaches or that allows each section to overlap the other to a varied extent so as to increase and decrease the diameter of the sizer 47. For an appropriate diameter, at least two sectioned pieces 43, 45 can be fixedly positioned relative to each other by the use of sizing channels 41, 49 or other openings, grooves or slots as understood by those skilled in the art. This would permit a single set of channel sizers 47 to accommodate different leads having different diameters.

The main member 32 can connect to the support structure, for example, by a clamp adapted to adjustably tighten around the main member and a corresponding portion of the housing 26. Alternatively, the main member, for example, can be magnetized so as to attach by magnetic attraction if the housing 26 is itself made of a suitable metallic material. Preferably, the main member includes at least two spaced-apart openings or holes 31 positioned to coincide with preselected portions of the housing for receiving a nut and bolt assembly 21 to connect the main member 32 to the housing 26. Preferably the main member 32, the plurality of secondary members 34, and the plurality of channel sizers 36 are formed of a lightweight material to enhance the ease with which the apparatus 20 can be positioned adjacent a plurality of leads and fitted adjacent the housing 26 to assist in forming channels therein.

Figure 3:
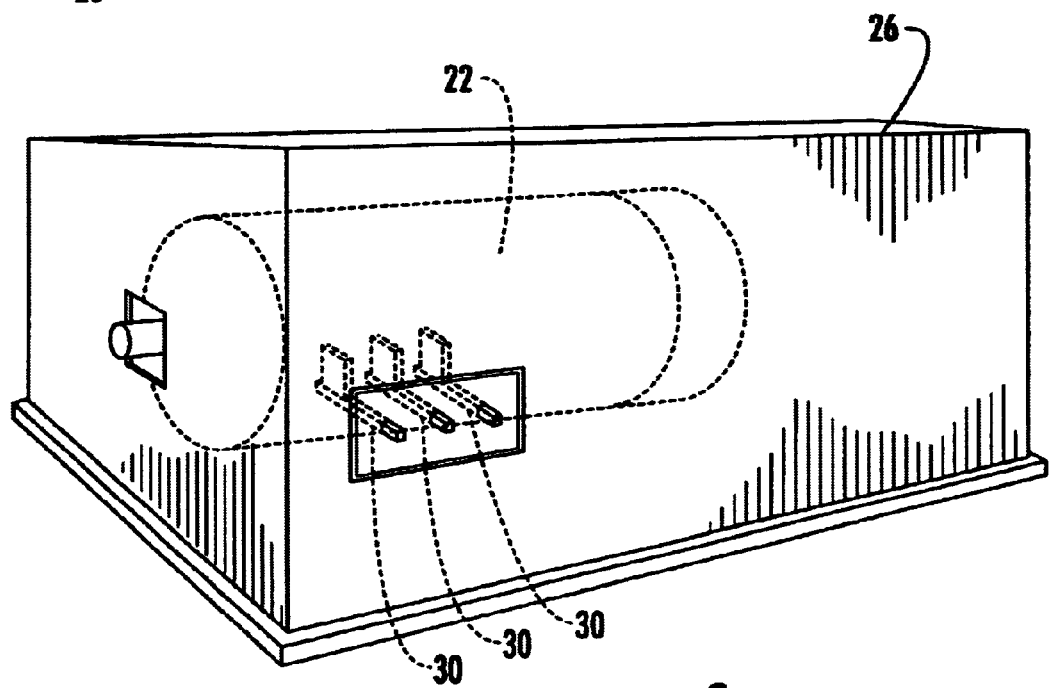
FIG. 3 is perspective view of a power generator housing having leads extending through the housing via channels formed with the assistance of an apparatus according to the present invention.

As shown in FIGS. 1–8, and perhaps best in FIGS. 2–4, the present invention further comprises method aspects for aligning and sizing a plurality of spaced-apart channels 28 to be formed in a cleat or other support structure 24 connected to a power generator housing 26 and positioned to hold therein a plurality of leads 30 that extend out from a power generator 22 through the housing 26. The method preferably includes aligning a first section of a sectioned tool relative to a first lead spaced-apart from the support structure. The method further includes then aligning at least a second section of a sectioned tool relative to a second lead spaced-apart the first lead a predetermined distance. As another step, the method can include positioning the tool adjacent the support structure to guide a user of the tool 20, 20' in forming at least a first and a second opening, e.g., hole, notch, groove, in the support structure such that the first opening is spaced-apart from the second opening at the predetermined distance and such that each opening is sized to accommodate respectively each lead. The sectioned tool can be a main member 32 having a plurality of secondary members 34 removably and slidably connected thereto and a channel sizer 36 positioned on each of the secondary members 34.

The method can further encompass registering the radial diameter of the first lead and of the second lead by positioning a first register, e.g., secondary member 34, adjacent the first lead and positioning at least a second register, e.g., another secondary member 34, to the second lead to thereby ensure that each hole is sized to accommodate each respective lead. The step of registering size or dimension, for example, can be accomplished using a channel sizer 36.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That claimed is:

1. An apparatus for assisting a user in aligning and sizing a plurality of spaced-apart channels to be formed in a support structure, the support structure being positioned for passing a plurality of leads extending from a power generator through a power generator housing, the apparatus comprising:

a main member adapted to be readily positioned adjacent the support structure;

a plurality of secondary members adjustably connected to the main member and independently positioned relative to each other to thereby permit the user to position each of the plurality of secondary members such that each of a pair of secondary members is spaced-apart from each other at a distance corresponding to a related distance between a corresponding pair of the plurality of leads to thereby assist the user in selecting a position in the support structure to form each of the plurality of spaced-apart channels such that the plurality of spaced-apart channels are substantially aligned with each of the plurality of leads; and a plurality of channel sizers each connected to a corresponding one of the plurality of secondary members to assist the user in sizing each of the plurality of spaced-apart channels to be formed in the support structure such that each of the spaced-apart channels accommodates a corresponding one of the plurality of leads.

2. The apparatus of claim 1, wherein each of the secondary members is adapted to be removably attached to the main member to thereby permit the number of secondary members attached to the main member to be varied to correspond to the number of leads and the number of channels to be formed in the support structure.

3. The apparatus of claim 1, wherein each of the plurality of secondary members is rotatably connected to the main member to thereby provide greater degrees of freedom in positioning each of the secondary members connected to the main member.

4. The apparatus of claim 1, wherein the main member has a plurality of openings formed therein so that the main member can be readily connected to the support structure.

5. The apparatus of claim 1, wherein the apparatus further includes a plurality of secondary member fasteners connected to the plurality of secondary members to the main member, and wherein the main member comprises an elongate main body having a channel formed therein and extending substantially in the elongate direction of the elongate main body to receive each of the plurality of secondary member fasteners and permit each of the plurality of secondary members to slidably connect to the main member at a plurality of points along the elongate extent of the elongate main member body.

6. The apparatus of claim 5, wherein each of the plurality of secondary members comprises an elongate secondary member body having a channel formed therein and extending substantially in the elongate direction of the elongate secondary member body to receive a corresponding one of the plurality of secondary member fasteners to thereby permit each of the plurality of secondary members to slidably connect to the main member at a plurality of points along the lengthwise extent of the elongate secondary member body.

7. The apparatus of claim 5, wherein each of the plurality of secondary members comprises an elongate secondary member body having a plurality of openings extending therethrough, each of the plurality of openings being spaced-apart and adapted to receive a corresponding one of the plurality of secondary member fasteners to thereby connect a corresponding one of the plurality of secondary members to the main member.

8. The apparatus of claim 1, wherein the apparatus further includes a plurality of secondary member fasteners connected to the plurality of secondary members and to the main member, and wherein the main member comprises an elongate main member body having a plurality of openings extending therethrough, each of the plurality of openings being positioned substantially along the elongate extent of the elongate main member body and adapted to receive a corresponding one of the plurality of secondary member fasteners to thereby permit each of the plurality of secondary members to be connected to the main member at preselected distances from each of the secondary members.

9. The apparatus of claim 8, wherein each of the plurality of secondary members comprises an elongate secondary member body having a channel formed therein and extending substantially in the elongate direction of the elongate secondary member body to receive a corresponding one of the plurality of secondary member fasteners to thereby permit each of the plurality of secondary members to slidably connect to the main member at a plurality of points along the elongate extent of the elongate secondary member body.

* * * * *